April 22, 1930.  S. MARKS  1,756,006
EMERGENCY WHEEL FOR AUTOMOBILES
Filed Aug. 21, 1928
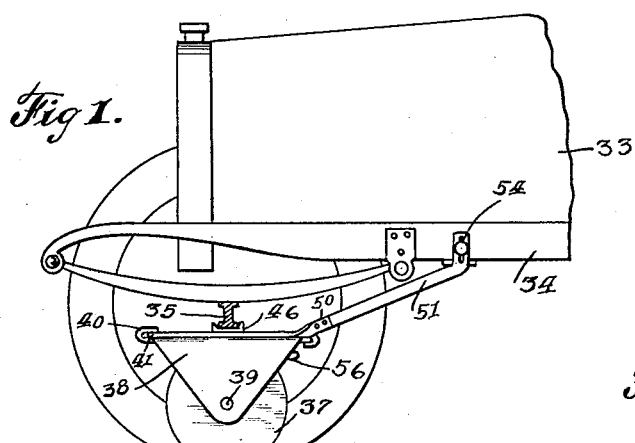
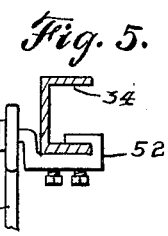
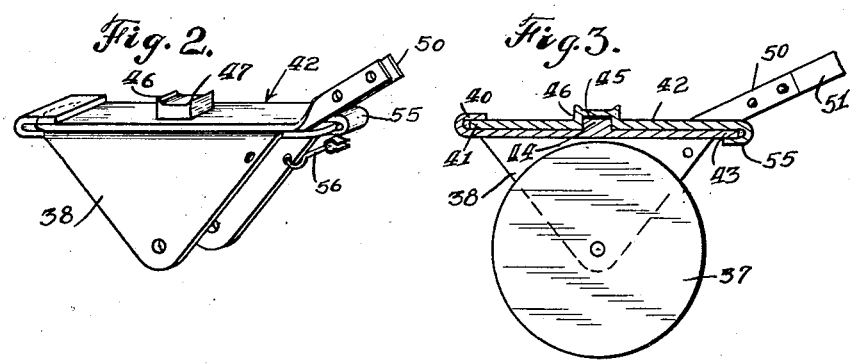
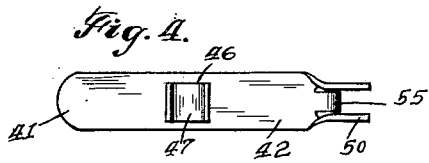
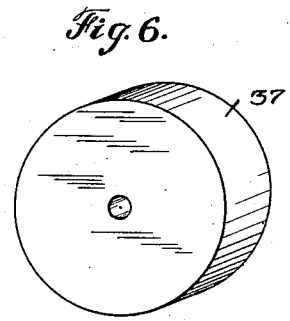
Inventor
Sidney Marks Patented Apr. 22, 1930

1,756,006

UNITED STATES PATENT OFFICE

SIDNEY MARKS, OF NEW YORK, N. Y., ASSIGNOR OF ONE-HALF TO WARREN W. WARD, OF NEW YORK, N. Y.

EMERGENCY WHEEL FOR AUTOMOBILES

Application filed August 21, 1928. Serial No. 301,114.

This invention relates to an emergency wheel for vehicles and more particularly, to an emergency wheel and support therefor which may be carried in the tool kit in automotive vehicles.

In many cases of accident, such as smashed wheel, bent axle, flat tire or damaged wheel results from the mishap, the driver is forced under such conditions, to call a service station and await the emergency wagon to tow him in. If the driver is in a great hurry, he must nevertheless wait quite a long time to be towed to a garage, or the nearest place where his vehicle may be fixed, thereby losing a great deal of valuable time, resulting in the loss of business and money. Then too, as bad weather is a most wonderful agent for causing such inconveniences to travelers, the service stations do as a result a most profiting business, in the meantime, necessitating the driver to wait much longer. Then again, the cost of being towed-in is quite enormous.

With my invention, which is light in weight, simple in construction, and cheap in manufacture, I overcome the inconveniences and loss of time above stated. My invention may be assembled by any driver of a car, in a few minutes, and put in place under vehicle, taking the palce of damaged wheel and put the vehicle in operating condition. My invention saves the driver loss of time, and inconvenience of waiting to be towed-in and also the money the towers charge.

The object of this invention is to provide an apparatus to be used in case of an emergency or damage to a vehicle wheel, said apparatus to be simple in the novelty of construction, easy to assemble, and may be done by anyone competent of handling a car.

Still another object is to provide an apparatus which is reliable and to permit the vehicle to proceed at a moderate rate of speed, which when not in use may be carried in the vehicle tool box and when needed may be applied with the ordinary tools commonly carried in vehicle tool chests.

My invention may be better understood by reference to each figure in the accompanying drawing, in which Figure 1 is a side elevational view of emergency device, in position under front axle of an automobile.

Figure 2 is a perspective view of the frame portion of device.

Figure 3 is a side elevational view with parts in section.

Figure 4 is a top plan view of top member of device.

Figure 5 is an end view showing connecting parts to chassis, and

Figure 6 is a perspective view of wheel, or roller.

In accordance with my invention, I provide an emergency wheel journaled upon an axle, carried by a sheath, or housing member which in turn pivots to an anchorage or securing member which in times of emergency is passed under the axle end near the damaged wheel and anchored to frame of car. The special make and bracing effect of the sheath and its clamped connections with anchorage member relieves the axle of any tendency towards twisting, and the load of the axle at the same time is being carried vertically above the axle of emergency wheel.

Referring now to the drawings in detail, 33 is a motor vehicle having the usual mechanism. The emergency wheel 37 which, preferably having a relatively wide face and provided with rubber or other resilient material, is mounted within sheath 38, upon axle 39. The top portion of sheath is flat with one end bent upwards and parallel to itself as at 40, snugly overlying forward end 41 of anchorage member 42. Rear end of upper portion of sheath terminates in a flat circular portion 43. At the central top portion of sheath is a pivotal stub 44 which fits into bore 45 of anchor member 42. Anchor member 42 has a boss 46 at the top, the center of which is depressed as at 47 to receive the axle of car. It is also provided with upstanding arms 50 by means of which an extension bar 51 is secured to anchor member 42 in cases where it is desirable to have the anchor member in two pieces instead of one. The extension bar may be anchored to frame as shown at Figure 5, in which the clamping device 52 having a pivot end 53 is adapted to receive slot portion 54 of bar 51. Slot 54 allows an up and down movement of car body without transferring said movement to emergency wheel. At the rear, a portion 55, of anchor member is turned downwards and forwards, completing the holding means for anchorage and sheath. To remove anchor member from sheath it is only necessary to turn them about the axis 44 until the end 41 and 43 slips from out 40 and 55. The emergency wheel is provided with a connection link 56 which may be connected to steering mechanism when in use in front part of car.

While I have shown and described certain preferred embodiments of my invention, it will be apparent that modifications and changes may be made without departing from the spirit and scope of my invention.

Having thus described my invention, what I claim as new and wish to protect by Letters Patent, is:

1. An emergency wheel device for vehicles, comprising a wheel rotatably mounted upon an axle, a sheath carrying said axle, an anchor member pivotally attached to said sheath, said anchor member having at one end, and formed integral therewith, means for maintaining contact between said anchor member and said sheath member, and permitting horizontal movement of one with respect to the other, substantially as described.

2. An emergency wheel device for vehicles comprising a wheel rotatably mounted upon an axle, a sheath carrying said axle, an anchor member pivotally attached to said sheath, said anchor member having at one end, and formed integral therewith, means for maintaining contact between said anchor member and said sheath member, and permitting horizontal movement of one with respect to the other, and having connecting means by which said sheath may be manipulated horizontally through the instrumentality of the steering mechanism of said vehicle, substantially as described.

In testimony whereof I have signed my name to this specification.

SIDNEY MARKS.